Nov. 19, 1963   A. FINK   3,110,969
PRECISION GEAR TESTER
Filed May 23, 1962   2 Sheets-Sheet 1
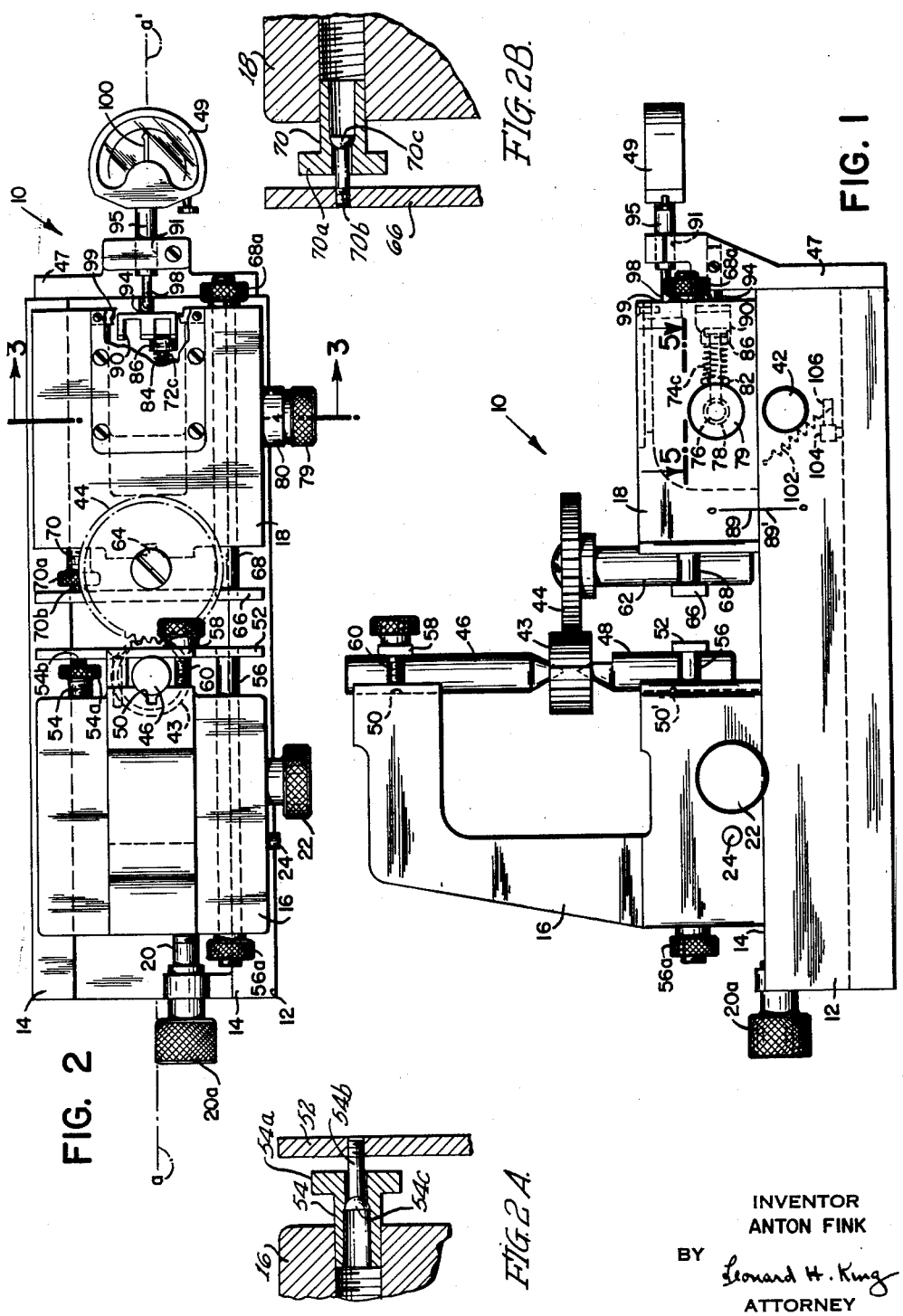
INVENTOR
ANTON FINK
BY Leonard H. King
ATTORNEY Nov. 19, 1963   A. FINK   3,110,969
PRECISION GEAR TESTER Filed May 23, 1962   2 Sheets-Sheet 2

INVENTOR
ANTON FINK

BY Leonard H. King
ATTORNEY

United States Patent Office 3,110,969
Patented Nov. 19, 1963

3,110,969
PRECISION GEAR TESTER
Anton Fink, 94—11 207th St., Queens Village, N.Y.
Filed May 23, 1962, Ser. No. 196,929
11 Claims. (Cl. 33—179.5)

The present invention relates to a device for comparing a precision gear of unknown character with a standard or master gear with regard to concentricity, backlash and meshing characteristics. More particularly, the present invention provides novel means for applying selected pressures to bring a pair of gears into mesh whereby a very high degree of accuracy in the measurement of gear characteristics is attained.

For use in the fields of computation, instrumentation, and process control, gears must often meet critical tolerances so as to assure that these gears will function within the accuracy required in the given application. Thus, in certain mechanisms, backlash must be reduced to a minimum in order to provide superior meshing characteristics in a gear train. In typical position sensing devices, deviation of as little as 0.0001" in gear concentricity may be the maximum deviation permissible.

Blacklash is an important factor in instrumentation. The two primary difficulties encountered through backlash are instability in the feedback loop of a servo system and error between output elements.

The main factors contributing to backlash which are measurable by the apparatus include:

(1) Improper center distances due to excessive machining tolerances;
(2) Variation of pitch radius attributable to gear manufacture;
(3) Eccentricity between shaft and pinion mounted thereon;
(4) Eccentricity of gear (bore to pitch diameter);
(5) Tooth to tooth error.

Error in center distances due to excessive machining tolerances must be minimized by allowing tolerances of the proper value to give less than maximum permissible blacklash. Run-out of mating gears, errors in pitch and pitch diameter, tooth thickness, etc., must be controlled to remain within maximum blacklash tolerances.

Precision gears are generally classed as Precision 1, Precision 2, Precision 3, and Uutra Precision 1, or they may be required to meet specialized Government or industrial specifications. There are in current use, for example, in addition to military specifications, National Aerospace #726 and #727 gear specifications.

A commercially feasible gear tester must be capable of providing rapid, accurate checking means for a considerable range of gear sizes and tooth contours wherein different tolerance requirements, hence different meshing pressures, are specified.

It is therefore a primary object of the present invention to provide an improved gear tester having a set of accurately calibrated, conveniently selectable testing pressure producing means suitable for a variety of different gear types.

A further object of the present invention is to provide improved accuracy in measurement whereby the displacement force representing the error is parallel to the applied pressure urging the gears into mesh, and whereby the component of displacement is an accurate indication of error in gear configuration.

Yet a further object of the present invention is to provide an improved gear tester which can be rapidly set up to test gears having a wide range of dimension.

These and other objects and advantages of the present invention will be pointed out with further particularity or will be apparent from the following description, in conjunction with the drawings appended hereto in which:

FIG. 1 is a side elevation of the device of the present invention.

FIG. 2 is a plan view, shown partly broken away.

FIGS. 2A and 2B are fragmentary views in section illustrating the ball joint connection of the cross bars.

Figure 3:
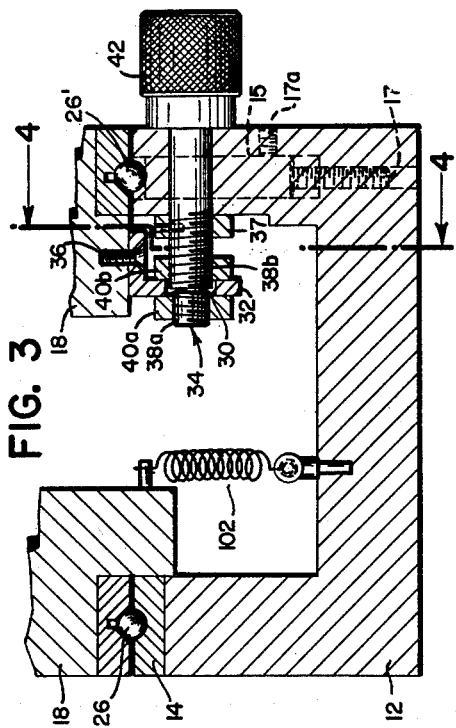
FIG. 3 is a cross-section taken along line 3—3 of FIG. 2.

Referring now to the drawings, there is shown in FIG. 1, in conjunction with FIG. 2, a device of the present invention characterized generally by the numeral 10 comprising a rigid base 12 having ways 14 formed longitudinally thereon on which are mounted carriage 16 and slide 18. Lead screw 20 manually actuated by knob 20a moves carriage 16 to a desired position, as explained hereinbelow, whereupon the carriage may be clamped rigidly to the base by a conventional clamping means actuated by knob 22. Pin 24 is provided to disengage a split nut clamping carriage 16 to lead screw 20 for relocation of the carriage position. Such split-nut clamping means are widely used and are not part of the present invention.

Slide member 18 may be displaced longitudinally along hardened steel ways 14 and hardened steel bearings 26, 26' (FIG. 3). Bearings 26' are supported on steel buttons 15. Set screw 17 adjusts the height on the button and set screw 17a locks the button in place. The movement of slide member 18 is restricted by set screws 28a, 28b, (FIG. 4) extending into slot 30 formed in L-bracket 32 through which passes clamping bolt 34. Bolt 34 is rotatably secured between knob 42 and washer 37 which is pinned to the bolt. Bracket 32 is secured to the bottom of slide member 18 by conventional fastening means such as screws 36. It will be noted that shaft 34 is provided with both right and left hand threaded portions 38a, 38b, whereby rotation of the knurled knob 42 selectively loosens or tightens the abutment of threaded discs 40a, 40b, on either side of bracket 32. The discs are keyed to each other by pins 41. Thus, turning knob member 42 will rapidly lock or release slide member 18. This locking arrangement is employed to lock the slide member away from fixed carriage 16 to facilitate changing of gears.

Referring again to FIG. 1, carriage 16 and slide member 18 are provided with means for supporting standard gear 43 and test gear 44, respectively, in meshing engagement. Upper and lower arbors 46 and 48, respectively, are accurately centered on and perpendicular to the median axis $a$, $a'$ by means of vertical V-shaped grooves 50, 50' formed on the upper and lower arm portions of C-shaped carriage 16, respectively. Clamping means are used to bring arbors 46 and 48 into close abutting registry with angular portions 50, 50'. The clamping means for arbor 48 includes a cross bar 52, which is urged into abutting registry with arbor 48 by threaded bolts 54 and 56, respectively. Knurled nut 54a moves bolt 54. Knurled knob 56a is integral with bolt 56 which mates with a threaded bore in member 16. As shown in FIG. 2A, a connecting link 54b joins bolt 54 to cross bar 52 by means of a ball joint 54c which permits of relative rotation between members. Upper mandrel 46 is clamped to abut against beveled portion 50 by L-bracket 58 in combination with clamping bolt 60 passing through one end thereof. By releasing the clamps, arbors 46 and 48 can be moved towards or away from each other to rotatably support master gear 43 therebetween. If desired a spline gear or other gear supporting fixture may be inserted therein.

Similarly, arbor 62 carried by slide member 18 rests against beveled surface 64 (FIG. 2). Arbor 62 is retained in place by cross-bar 66 which abuts this arbor by the action of threaded members 68 and 70, respectively. Knurled nut 68a acts on member 68. Knurled knob 70a controls member 70 which seats in a threaded bore in slide 18. As shown in FIG. 2B, a connecting link 70b joins member 70 to cross-bar 66 by means of a ball joint 70c which permits of relative rotation between members. Arbor 62 rotatably supports sample gear 44, whereby the arbors can be adjusted in the vertical plane to bring gear 44 into mesh with master gear 43.

With the sample and master gear in engagement, the two gears are rotated in meshing engagement, and with slide member 18 unrestrained, any deviation in the configuration of the sample gear from optimum will accordingly cause a corresponding movement of slide member 18 along ways 14. Attached to body 12 there is provided a bracket 47 which supports an indicator 49. As the slide member 18 moves back and forth, it actuates the indicator 49 providing an indication of error. It will be understood that in place of the conventional spring loaded indicator, one of the conventional commercially available recorders may be employed to provide a visible record. Many users require that such a record accompany shipment of precision gears. The specification to which the gear is required to perform normally specifies the pressure to be exerted between the sample and master gear. It will therefore be appreciated that the pressure applied between the gears must be variable and reproducible to a high degree of accuracy between tests in order to be of value.

Figure 5:
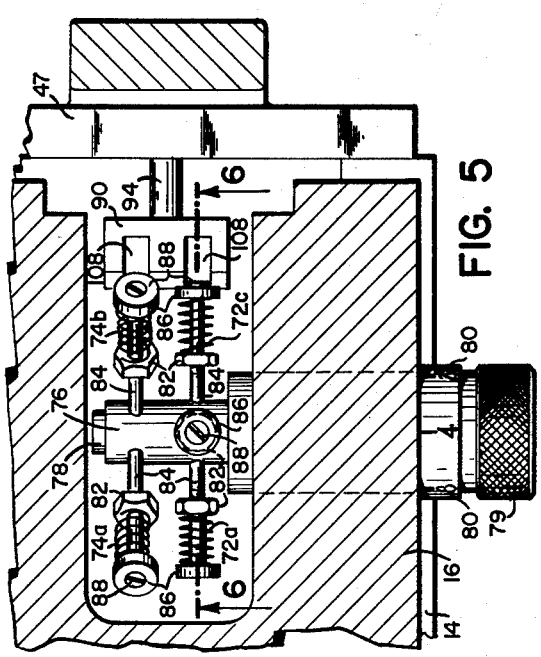
FIG. 5 is a section taken along line 5—5 of FIG. 1 and shows the spring pressure assembly of the present invention.
Figure 6:
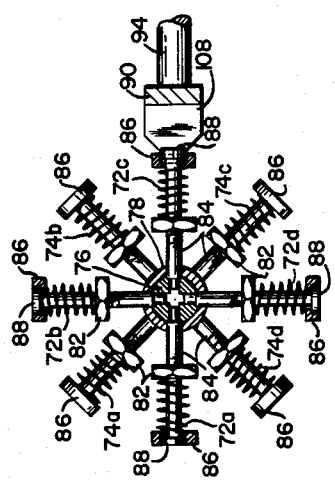
FIG. 6 is a cross-section taken along line 6—6 of FIG. 5.

It is a particular feature of the present invention that a set of accurate calibrated testing pressures is provided with rapid switching means to insert the proper pressure for the type of gear being tested. Thus, common power gears are adapted to mesh under considerable pressure, while a gear given in a precision readout device may be required to mesh properly with a pressure of only one or two ounces. As shown in FIGS. 5 and 6, the present invention provides a set of accurately calibrated testing springs 72a–72d and 74a–74d radially deployed upon sleeve 76 secured to cylinder shaft 78. Shaft 78, provided with indicia means 80, for selecting one of the eight springs, is manually rotated whereby the spring with the desired pressure is brought into the operable position where a conventional spring loaded detent means assures precise registration, as explained hereinbelow. It is to be understood that provision may be made for a lesser or greater number of springs.

The calibrated pressures are the standard pressures employed in the gear testing art, such as those prescribed by the American Gear Manufacturers Association, or a particular specification. It will be understood the compression of each spring is set by adjusting nut 82 which threadedly engages threaded shaft 84 to compress the spring against pressure pad 86, being restrained by stop member 88 formed on the end of shaft 84. Thus, shaft 84 can advance through the aperture to thereby increase the tension of the individual spring above its calibrated point. However, the spring normally is kept at its pressure setting, as set by nut 82.

As shown in FIGS. 5 and 6, the springs are arranged in two banks of four springs, each offset at 90° from the adjacent spring of the same bank, the two banks being offset 45° from each other. Thus shaft 78 will bring the spring into abutting relation with anvil 90 at each 45° turn of shaft 78. Anvil 90 is rigidly secured to bracket 47 by means of shaft 94. It should be noted that shaft 94 is aligned with axis a, a' of the base, hence with the center line of gears 43, 44. Springs 72a–72d and 74a–74d are displaced slightly to either side of this axis, but it will be appreciated the thrust of each individual spring in the operable condition is substantially coaxial, hence will urge gears 43 and 44 into meshing relationship almost exactly along this axis.

Figure 4:
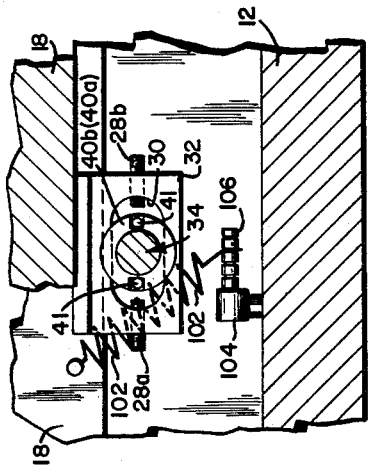
FIG. 4 is a cross-section taken along line 4—4 of FIG. 3.

As shown in FIGS. 1 and 2, bracket 47 is rigidly attached to base 12 and retains sleeve 95 of displacement indicator 49. Plunger 98, axially movable through sleeve 95 is also aligned with axis a, a'. Indicator 49 is customarily provided with a rack and pinion movement whereby the axial thrust of plunger 98 is translated into rotary motion, as shown by indicator hand 100. In the operable condition, pressure exerted by the instrument is counteracted by compensation spring 102 (FIGS. 3 and 4). Spring 102 is attached at one end to slide member 18 and at the other to base 12 by means of bracket 104 having notched arm 106 whereby the tension of the spring may be adjusted. Spring 102 exerts a downward thrust on slide member 18 keeping it on the ways, also a thrust towards the right urging slide member 18 into abutment with plunger 98, thus reducing the effective forward thrust of this plunger. It will be appreciated that this compensates for the effective pressure that indicator 96 can exert, hence permitting the tester to be used at meshing pressures less than that of the indicator. For example, if indicator 49 normally has a three-ounce pressure, and adjusting spring 102 exerts two ounces of pressure towards the right, there will result a net pressure of but one ounce exerted by indicator 49.

*Operation of Device*

The appropriate spring pressure for the intended gear is selected by means of knob 79 and indicia bearing dial 80. This knob positions the proper individual spring pressure pad 86 against anvil 90. Then the desired center distance between gears 43 and 44 is established by placing gage block(s) representing this measurement between arbors 48 and 52. With the gage block in place, carriage 16 is moved by lead screw 20 towards slide member 18 thereby displacing slide member 18 towards the right. This brings hardened steel pressure plate 99 of slide member 18 into contact with plunger 98. The movement of the lead screw is continued until dial indicator hand 100 reaches zero. As noted hereinabove, this zero adjustment will take place in cooperation with the setting of compensation spring 102, depending upon the type of indicator instrument 49 being employed.

With the dial indicator reading zero, carriage 16 is clamped to base 12 by operating knob 22. It will be noted that in this position the selected pressure spring, herein illustrated as 72c, is abutting against anvil 90 with pressure pad 86 flush against the anvil 90 and spring shaft 84 partly in recess 108 formed in anvil 90 to an amount establishing the correct tension to be exerted by the spring 72c.

The gage block is removed from the arbors, whereupon slide block 18 is moved slightly to the left by the action of spring 72c returning to the normal stressed state, namely, with stop member 88 abutting the pressure pad 86. Master gear 43 and sample gear 44 are placed upon arbors 48 and 62, respectively, the axis of these gears theoretically being that determined by the gage block. The meshing action of these gears serves to displace slide member 18 slightly to the right again at which point, if the sample gear is of optimum configuration, the desired test condition is obtained; namely, the indicator dial will be at zero, and the measuring spring will be compressed slightly to generate the desired meshing pressure upon the two gears, urging them into mesh at the proper test pressure. As the gears are rotated in mesh, any error will be recorded as a linear movement of the measuring slide. When the indicator 49 is installed, it is positioned so as to provide a zero reading when indicia 89, 89' on the sliding member 18 and base 12, respectively, coincide. A split bore 91 is provided as a convenient clamping means.

It should be carefully noted that in contradistinction to gear testers known in the prior art, the spring pressure urging the gears into mesh is applied coaxially with the center line of the gears. Therefore, there can be no ambiguity that the proper pressure is being applied. Any angular displacement from this line makes pressure application within close limits impossible to achieve. It should also be noted that the assorted pressures made available in the present invention make rapid testing possible over a wide range of gear types.

There has been disclosed heretofore the best embodiment of the invention presently contemplated and it is to be understood that various changes and modifications may be made by those skilled in the art without departing from the spirit of the invention.

What is claimed is:

1. A gear tester for comparing a first gear with a second gear comprising:
   (a) a base having a longitudinal ways formed therein;
   (b) a carriage movable along said ways and means for releasably clamping it to said base;
   (c) means disposed on said carriage for rotatably supporting said first gear;
   (d) a slide member displaceable along said ways relative to said carriage;
   (e) means disposed on said slide member for rotatably supporting said second gear in meshing engagement with said first gear in the assembled condition;
   (f) an anvil member carried by said base at one end thereof proximate to said slide member wherein said carriage, said slide member, and said anvil member are axially aligned;
   (g) a plurality of individual compression springs disposed on said slide member, said compression springs exerting preselected pressures in the compressed condition, a selected one of said springs being axially compressible against said anvil member to thereby urge said slide member towards said carriage, whereby said second gear is brought into meshing relationship with said first gear at said preselected pressure;
   (h) means to select one of said springs for compression against said anvil member; and
   (i) a displacement indication means positioned so as to detect axial displacement of said slide member relative to said carriage.

2. The apparatus of claim 1 wherein said spring selection means includes a shaft member supported by said slide member rotatable about an axis transverse to the direction of movement of said slide member, and having said compression springs carried by said shaft member.

3. The apparatus of claim 2 wherein said pressure springs are supported by said slide member in at least two parallel banks.

4. The apparatus of claim 3 wherein the said pressure springs in said banks are uniformly spaced about said shaft members with the springs in each of said banks angularly offset from those in the other bank.

5. The apparatus of claim 1 provided with adjustable tension means acting on said slide member in a direction aiding said compression springs.

6. The apparatus of claim 1 wherein the compression of each of said compression springs is independently adjustable.

7. The apparatus of claim 1 including means to limit the movement of said slide member.

8. The apparatus of claim 7 wherein said last named means comprises a slotted plate extending from said sliding member and a bolt carried by said base and having oppositely threaded portions extending through the slot in the plate, and a pair of oppositely threaded nuts seated on mated thread portions of said bolt, each of said pair being located on opposite sides of said plate for clamping said plate between them when said bolt is rotated in a direction tending to bring said nuts towards each other.

9. The apparatus of claim 8 including a pair of adjustable stops extending into the slot from opposite ends thereof and positioned so as to intercept said bolt.

10. The apparatus of claim 2 wherein said compression springs are mounted on individual headed threaded members extending radially from said bolt, a pressure pad slideably mounted on each of said threaded members and retained by the head of the member, and a nut engaged on each threaded member with said compression spring between said nut and said compression pad.

11. The apparatus of claim 10 wherein said anvil is provided with a seat for the pressure pad of the selected compression spring and a recess for receiving the head of the threaded member.

References Cited in the file of this patent

UNITED STATES PATENTS

| 2,731,728 | Turner | Jan. 24, 1956 |
| 2,741,034 | Donaghey | Apr. 10, 1956 |
| 2,767,479 | Sittler | Oct. 23, 1956 |

FOREIGN PATENTS

| 13,465 | Great Britain | 1911 |
| 608,163 | Germany | Jan. 18, 1935 |